United States Patent [19]

Hecht et al.

[11] Patent Number: 4,873,490
[45] Date of Patent: Oct. 10, 1989

[54] CIRCUIT ARRANGEMENT FOR GENERATING AN OUTPUT SIGNAL THAT IS NONLINEARLY DEPENDENT ON THE TEMPERATURE

[75] Inventors: Hans Hecht, Korntal; Winfried Kuhnt, Stuttgart, both of Fed. Rep. of Germany

[73] Assignee: Robert Bosch GmbH, Stuttgart, Fed. Rep. of Germany

[21] Appl. No.: 150,661

[22] PCT Filed: Mar. 19, 1987

[86] PCT No.: PCT/DE87/00118
§ 371 Date: Dec. 10, 1987
§ 102(e) Date: Dec. 10, 1987

[87] PCT Pub. No.: WO87/06337
PCT Pub. Date: Oct. 22, 1987

[30] Foreign Application Priority Data

Apr. 16, 1986 [DE] Fed. Rep. of Germany ....... 3612809

[51] Int. Cl.[4] .......................... G01K 7/00; G06G 7/12; G06G 7/00; H01L 31/00
[52] U.S. Cl. ........................................ 328/3; 328/135; 328/142; 307/310; 307/490; 307/491; 307/494; 307/529
[58] Field of Search ............... 307/310, 490, 491, 494, 307/529; 328/3, 135, 142

[56] References Cited

FOREIGN PATENT DOCUMENTS 0073425 5/1982 Japan ..................................... 328/3

OTHER PUBLICATIONS

Oswald, "Thermistor Temperature to Current Transducer", IBM Technical Disclosure Bulletin, vol. 7, No. 12, May 1965.

Primary Examiner—Stanley D. Miller
Assistant Examiner—Trong Quang Phan
Attorney, Agent, or Firm—Michael J. Striker

[57] ABSTRACT

A circuit arrangement is proposed which generates a temperature-dependent output signal that has a virtually ideally quadratic temperature dependency. The circuit arrangement is therefore particularly well suited for high-precision temperature compensation in sensor signal evaluation circuits. At the same time, it is particularly suitable for production by thick-film or thin-film techniques.

3 Claims, 1 Drawing Sheet

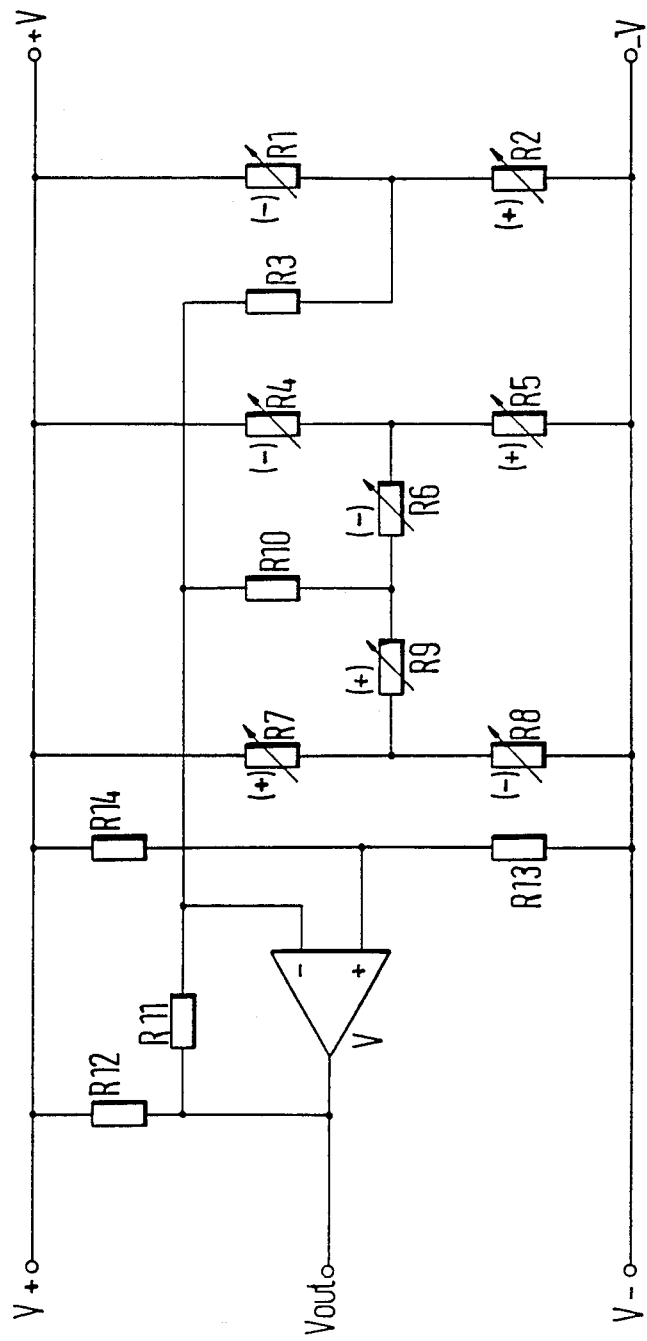

CIRCUIT ARRANGEMENT FOR GENERATING AN OUTPUT SIGNAL THAT IS NONLINEARLY DEPENDENT ON THE TEMPERATURE

STATE OF THE ART

The invention relates to a circuit arrangement for generating a signal that is non-linearly dependent on temperature and having a temperature-dependent resistor bridge circuit connected between two power-supply lines.

A circuit arrangement of this type is already known from the publication entitled "Guidebook of Electronic Circuits", McGraw-Hill, U.S.A., 1974. The circuit arrangement is designed as a bridge amplifier in which a resistor bridge circuit having two temperature-dependent resistors is connected in such a way that the temperature-dependent resistors are diagonally opposite one another. The temperature-dependent bridge voltage present in the bridge diagonal is amplified by an operational amplifier, the output of which is fed back via a resistor to the inverting input of the operational amplifier and thus fed back into the resistor bridge circuit. When there are major temperature deviations from the normal state, the circuit arrangement exhibits a notable non-linearity, which is negligible, however, with minor temperature deviations.

From German Utility Model 81 19 025, a sensor is known for detecting the pressure of a medium, using at least one element that varies its resistance under the influence of pressure. This element is preferably embodied by a resistor bridge circuit, the individual resistors of which are formed by thick-film techniques using a resistor paste. The element is disposed on a substrate that is elastically deformable in response to pressure, so that when pressure is exerted, a voltage signal is produced in the bridge diagonal. For temperature compensation, resistor pastes having different temperature coefficients can be used.

In designing circuit arrangements for evaluating sensor signals, it often becomes necessary to provide suitable measures for temperature compensation. Typically, the temperature response of the output signal of the circuit arrangement is first calculated or plotted. The temperature response can be represented mathematically as a function dependent on the temperature, which in turn can be developed into a power series. For most technical applications, it is sufficient for the linear member of the temperature response to be compensated for, since the higherorder members are sufficiently small with respect to an allowable tolerance. For high-precision applications, however, provisions must be made to compensate for quadratic and sometimes even higher components of the temperature response. The actual compensation is then generally such that a separate temperature-dependent signal is formed within the circuit arrangement, and this signal is suitably added to or subtracted from the output signal.

Accordingly, it is the object of the present invention to provide a circuit arrangement for generating an output signal that is nonlinearly and in particular quadratically dependent on the temperature, the circuit arrangement being particularly simple in structure and therefore capable of being incorporated into virtually any other circuit arrangement in a space-saving manner without requiring special provisions to that end.

This object is attained by the circuit arrangement having a bridge circuit assembled of two pairs of temperature-dependent resistors of opposite temperature coefficients interconnected at diagonally opposite junction points, each of the junction points corresponding to a connection point of a resistors having a negative temperature coefficient, one pair of the opposite junction points being connected to a power supply; and a series circuit of two resistors of opposite temperature coefficients being connected between the other pair of opposite junction points whereby the output signal is formed at the connection point of the two resistors in the series circuit.

ADVANTAGES OF THE INVENTION

The circuit arrangement according to the invention has the particular advantage over the circuit arrangement known from the prior art that it comprises solely resistor elements and therefore can be applied particularly simply to a substrate using thick-film or thin-film techniques by means of resistor pastes having various temperature coefficients. It is therefore also usable for temperature compensation in monolithically integrated circuits, if these circuits are simultaneously applied to a substrate, along with the circuit arrangement according to the invention, using hybrid technology.

Further features of the circuit arrangement according to the invention are defined by the dependent claims. It is particularly advantageous the series circuit of two resistors at least one of which has a resistance dependent on the temperature to be provided parallel to the bridge circuits according to the invention. The divider voltage of this resistor arrangement can then be added to the output voltage of the resistor bridge circuit, preferably by means of a summing amplifier with a high-resistance input, as a result of which an output voltage having a virtually arbitrary linear and quadratic temperature dependency can be established.

DRAWING

An exemplary embodiment of the invention is shown in the drawing in the form of a circuit diagram and described in further detail in the ensuing description.

DESCRIPTION OF THE EXEMPLARY EMBODIMENT

In the sole figure of the drawing, a circuit arrangement is shown, which is operated between a supply voltage line identified as $V_+$ and a supply voltage line identified as $V_-$.

Three sets of resistors R1–R9 are connected in a star circuit each, whereby the resistors R4–R9 are connected in a bridge circuit between the $V_+$ and $V_-$ lines. The first star circuit R1, R2, R3 is applied via the resistor R1 to the $V_+$ and via the resistor R2 to the $V_-$ line. The second star circuit R4, R5, R6 is applied via the resistor R4 to the $V_+$ and via the 20 resistor R5 to the $V_-$ line. The third star circuit R7, R8, R9, finally, is applied via the resistor R7 to the $V_+$ and via the resistor R8 to the $V_-$ line. The resistors R6 of the second star circuit and R9 of the third star circuit are connected to one another in a diagonal of the bridge circuit and are applied via a coupling resistor R10 to the resistor R3 of the first star circuit. The junction point of the resistors R3 R10 leads to the inverting input of a summing operational amplifier V. A feedback resistor R11 is connected between the inverting input and the output of the amplifier V. A resistor R12 leads from the $V_+$ line to the output of the amplifier V. The non-inverting input of the amplifier V is applied via a resistor R13 for quiescent current compensation to the V_ line; a resistor R14 leads from the non-inverting input to the V_+ line.

Also shown in the drawing are those resistors that have a specific temperature coefficient. That is, the resistors R1, R4, R6, R8 have a temperature coefficient having a negative sign (−), and the resistors R2, R5, R7, R9 have temperature coefficients having a positive sign (+).

This provision has the effect that the potential of the voltage at the junction point of the resistors R1, R2 is approximately linearly dependent on the temperature, while the potential at the junction point of the resistors R6, R9 is approximately quadratically dependent on the temperature. Since the amplifier V acts in a known manner via the coupling resistors R3, R10 and the feedback resistor R11 as a summing amplifier, the output signal $V_{out}$ accordingly varies both linearly and quadratically with the temperature.

By suitable dimensioning of the resistors and of the individual temperature coefficients, one skilled in the art is in a position to generate temperature-dependent signal that depends linearly and quadratically on the temperature. One possible dimensioning of the complete circuit arrangement may be given as follows: Supply voltages $V_- = 0$ V and $V_+ = 5$ V Amplifier V, type TAF 2453 G

| Resistors | Resistance (kΩ) | Temperature coefficient (ppm/k) |
|---|---|---|
| R1 | 4 | −2000 |
| R2 | 4 | +1500 |
| R3 | 25 | 0 |
| R4 | 2 | −2000 |
| R5 | 2 | +1500 |
| R6 | 4 | −2000 |
| R7 | 2 | +1500 |
| R8 | 2 | −2000 |
| R9 | 4 | +1500 |
| R10 | 5 | 0 |
| R11 | 70 | 0 |
| R12 | 0.75 | 0 |
| R13 | 5 | 0 |
| R14 | 5 | 0 |

By thick-film techniques, the resistors are first applied with a smaller size than they will later have on a ceramic substrate, and then trimmed to the precise value with the aid of a laser cut.

The exemplary embodiment is used in the temperature compensation of a thick-film pressure sensor element. However, it is also universally applicable for other purposes as well.

We claim:

1. A circuit arrangement for generating a signal that is non-linearly dependent on the temperature, comprising two power supply lines; a temperature-dependent resistor bridge circuit having two pairs of series connected resistors of opposite temperature coefficients interconnected at two opposite junction points; each of said junction points corresponding to a connection point of a resistor having a positive temperature coefficient and a resistor having a negative temperature coefficient; said opposite junction points being connected between said power supply lines; a series circuit of a resistor having a negative temperature coefficient and a resistor having a positive temperature coefficient being connected between the connection points of said series connected resistor in said two pairs whereby the non-linearly dependent signal is formed at the connection point of the two resistors of said series circuit.

2. A circuit arrangement as defined in claim 1 wherein an additional series circuit of two resistors of which at least one is temperature dependent, is connected between said power supply lines, whereby an additional temperature-dependent signal being formed at the connection point of the two resistors of said additional series circuit; and a third series circuit of two coupling resistors is connected between the connection point of said first mentioned series circuit and the connection point of said additional series circuit to add at its connection point said non-linearly dependent signal to said additional temperature dependent signal.

3. A circuit arrangement as defined in claim 2, further comprising a summing operational amplifier having its inverting input connected to the connection point of said coupling circuit of the two coupling resistors to produce at its output a modified signal which is both non-linearly and linearly dependent on temperature.

* * * * *